US011827838B2

(12) United States Patent
Khramov et al.

(10) Patent No.: US 11,827,838 B2
(45) Date of Patent: Nov. 28, 2023

(54) POLYMERIC AMIDOAMINE EMULSIFIERS

(71) Applicant: Schlumberger Technology Corporation, Sugar Land, TX (US)

(72) Inventors: Dimitri M. Khramov, Katy, TX (US); Stephen Cliffe, Houston, TX (US); Reda Karoum, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/595,244

(22) PCT Filed: May 15, 2020

(86) PCT No.: PCT/US2020/033021
§ 371 (c)(1),
(2) Date: Nov. 12, 2021

(87) PCT Pub. No.: WO2020/232318
PCT Pub. Date: Nov. 19, 2020

(65) Prior Publication Data
US 2022/0220356 A1 Jul. 14, 2022

Related U.S. Application Data

(60) Provisional application No. 62/848,273, filed on May 15, 2019.

(51) Int. Cl.
C09K 8/28 (2006.01)
C09K 23/22 (2022.01)
C09K 23/34 (2022.01)
C09K 23/16 (2022.01)
C09K 8/24 (2006.01)

(52) U.S. Cl.
CPC .......... *C09K 8/28* (2013.01); *C09K 8/24* (2013.01); *C09K 23/16* (2022.01); *C09K 23/22* (2022.01); *C09K 23/34* (2022.01)

(58) Field of Classification Search
None
See application file for complete search history.

(56) References Cited

U.S. PATENT DOCUMENTS

| | | |
|---|---|---|
| 2004/0259738 A1 | 12/2004 | Patel |
| 2007/0093393 A1 | 4/2007 | Navarrete et al. |
| 2011/0160099 A1 | 6/2011 | Patel et al. |
| 2017/0283680 A1* | 10/2017 | Chen .................. C09K 8/36 |
| 2018/0244976 A1 | 2/2018 | Cliffe |

FOREIGN PATENT DOCUMENTS

| | | |
|---|---|---|
| WO | 2017081325 A1 | 5/2017 |
| WO | 2017173010 A1 | 10/2017 |
| WO | 2019028198 A1 | 2/2019 |

OTHER PUBLICATIONS

Exam Report issued in United Kingdom Patent Application No. GB2116452.0 dated Aug. 26, 2022, 6 pages.

* cited by examiner

*Primary Examiner* — Jeffrey D Washville

(57) ABSTRACT

Wellbore fluids may include an oleaginous continuous phase; a non-oleaginous discontinuous phase; and a polymeric amidoamine emulsifier stabilizing the non-oleaginous discontinuous phase in the oleaginous continuous phase, wherein the polymeric amidoamine emulsifier has at least 5 repeating units. Wellbore fluids may include an oleaginous continuous phase; a non-oleaginous discontinuous phase; and a polymeric amidoamine emulsifier stabilizing the non-oleaginous discontinuous phase in the oleaginous continuous phase, wherein the polymeric amidoamine emulsifier includes at least 3 repeating units selected from allylamine, polyaminopolyamide, N-alkyl acrylamides, (meth)acrylic acid, alkyleneamine reacted with a dicarboxylic acid, alpha-olefin-alt-maleic anhydride, styrene maleic anhydride, alkylene oxide, wherein one or more amine or acid group on the repeating unit is amidized.

11 Claims, No Drawings

POLYMERIC AMIDOAMINE EMULSIFIERS

CROSS REFERENCE PARAGRAPH

This application claims the benefit of U.S. Provisional Application No. 62/848,273 entitled "Polymeric Amidoamine Emulsifiers," filed May 15, 2019, the disclosure of which is incorporated herein by reference.

BACKGROUND

During wellbore operations, various fluids may be used in the well for a variety of functions. The fluids may be circulated through a bore hole, which may subsequently flow upward through the wellbore to the surface. During this circulation, the drilling fluid may remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Drilling fluids are typically classified according to their base material; in oil based fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Oil-based wellbore fluids such as invert emulsion muds include an oleaginous liquid such as hydrocarbon oil which serves as a continuous phase, a non-oleaginous liquid such as water or brine solution which serves as a discontinuous phase, and an emulsifying agent. Emulsifying agents may be used to lower the interfacial tension of the liquids so that the non-oleaginous liquid may form a stable dispersion of fine droplets in the oleaginous liquid. Additionally, such invert emulsion fluids may contain one or more weighting agents, surfactants, viscosifiers, fluid loss control agents or bridging agents.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to wellbore fluids that may include an oleaginous continuous phase; a non-oleaginous discontinuous phase; and a polymeric amidoamine emulsifier stabilizing the non-oleaginous discontinuous phase in the oleaginous continuous phase, wherein the polymeric amidoamine emulsifier has at least 5 repeating units.

In another aspect, embodiments of the present disclosure are directed to wellbore fluids that may include an oleaginous continuous phase; a non-oleaginous discontinuous phase; and a polymeric amidoamine emulsifier stabilizing the non-oleaginous discontinuous phase in the oleaginous continuous phase, wherein the polymeric amidoamine emulsifier includes at least 3 repeating units selected from allylamine, polyaminopolyamide, N-alkyl acrylamides, (meth)acrylic acid, alkyleneamine reacted with a dicarboxylic acid, alpha-olefin-alt-maleic anhydride, styrene maleic anhydride, alkylene oxide, wherein one or more amine or acid group on the repeating unit is amidized.

In yet another aspect, embodiments of the present disclosure may include methods of drilling a wellbore with an oil-based mud, wherein the oil-based mud is an invert emulsion including an emulsifier stabilizing the invert emulsion, wherein the emulsifier is the product of a reaction between an alkyl cyclic anhydride and a polar reactant, wherein the polar reactant is one or more selected from poly(allylamine), poly(ethyleneimine), polyaminopolyamide, and polyacrylamide.

Other aspects and advantages of the claimed subject matter will be apparent from the following description and the appended claims.

DETAILED DESCRIPTION

This disclosure relates generally to emulsifier compositions used to stabilize invert emulsions. In one or more embodiments, emulsifiers in accordance with the present disclosure may include polymeric amidoamine based emulsifiers. In some embodiments, emulsifiers may promote invert emulsion stability at high-pressure high-temperature (HPHT) conditions such as those encountered within a wellbore.

Conventional emulsifiers used in wellbore applications to stabilize emulsions may undergo degradation in extreme conditions, leading to fluid instability, sagging, and phase separation. For example, emulsifiers conventionally used in oil-based muds may be susceptible to hydrolytic degradation because the aqueous phases may contain substantial amounts of caustic materials such as lime and elevated pHs that can initiate hydrolysis of labile bonds in the emulsifier, particularly at elevated temperatures.

Polymeric amidoamine emulsifiers in accordance with the present, disclosure may be used to prepare emulsified wellbore fluids, including water-in-oil or invert emulsions in which an aqueous internal phase is stabilized by a surfactant in an oil continuous phase. The presently described surfactants, such as polyamidoamine surfactants, are polymers comprised of units that often have a hydrophobic portion of the molecule that interacts with oleaginous fluids and a hydrophilic, often polar, portion of the molecule that interacts with aqueous fluids. When combined with a mixture of aqueous and oleaginous fluids, the surfactant orients at the interface between the phases and forms a micelle. Depending on the balance between the hydrophobic and hydrophilic portions of the molecules, surfactants may form stronger barriers between the phases and more stable emulsions.

In one or more embodiments, polymeric amidoamine emulsifiers may be used as emulsifiers for formulating oil-based muds. Further, emulsifiers in accordance with the present disclosure may have favorable impacts on wellbore fluid rheology, including improving pumpability and preventing particulate sag and shale dispersion. Polymeric amidoamine emulsifiers may also be prepared from synthetic polymers, which may be tuned to control molecular weight and degree of branching, allowing a greater degree of flexibility over conventional fatty acid-based surfactants derived from smaller and/or natural compounds. The tunable ratio of the polymeric constituents of the emulsifier also makes it possible to control polymerization and select the hydrophilic/lipophilic balance (HLB) ratio of the emulsifiers.

Polymeric amidoamine emulsifiers in accordance with the present disclosure may include linear and/or branched structures that occupy larger footprints on the surface of emulsion micelles than emulsifiers prepared via conventional routes (and which may be smaller molecules), and further may have a decreased tendency to crystallize out of solution or develop unreasonably high or low temperature rheology in various base oils.

As mentioned, the polymeric nature of the polymeric amidoamine emulsifiers may result in a larger molecule than conventional amidoamine emulsifiers. For example, in one or more embodiments, the polymeric amidoamine emulsifiers may have at least three or at least five repeating units. However, it is also envisioned that there may be at least ten or more repeating units if larger molecules are used. Thus, in one or more embodiments, the polymeric amidoamine emulsifier may have a weight average molecular weight that is at least 1000 Da, or in more particular embodiments, ranging from 1000 Da to 10,000 Da.

Thus, it is envisioned, for example, that the polymeric emulsifiers of the present disclosure may be based on poly(ethyleneminine), poly(allyl amine), alpha-olefin maleic copolymers, poly(acrylic) acids, poly(methacrylic) acids, poly(maleic anhydride), or polyaminopolyamide. That is, it is envisioned that the repeating units may be selected from allylamine, polyaminopolyamide, N-alkyl acrylamides, (meth)acrylic acid, alkyleneamine reacted with a dicarboxylic acid, alpha-olefin-alt-maleic anhydride, styrene maleic anhydride, alkylene oxide, and/or alkylene amine in one or more embodiments (and particularly when the number of repeating units is at least 5). In other embodiments, the repeating units may be selected (particularly when the number of repeating units is at least 3) from allylamine, polyaminopolyamide, N-alkyl acrylamides, (meth)acrylic acid, alkyleneamine reacted with a dicarboxylic acid, alpha-olefin-alt-maleic anhydride, styrene maleic anhydride, and/or alkylene oxide.

In one or more embodiments, polymeric amidoamine emulsifiers may be the product of a polar reactant comprising nitrogen moieties. In some instances, this polar reactant is in fact polymeric, while in other instances, the polar reactant is not polymeric but may be reacted with a polymeric component to form the polymeric emulsifier. Another reactant used to form the polymeric amidoamine emulsifiers is a fatty component, often a fatty acid, that is used to provide the hydrophobic portion of the emulsifier. Finally, while the nitrogen components provide some hydrophilicity to the resulting reaction product, embodiments may also include a polycarboxylic acid or anhydride as a reactant, providing greater hydrophilicity to the resulting component. In one or more embodiments, polymeric amidoamine emulsifiers may be the product of an amine derivatized polymeric acid.

In one or more embodiments, polymeric amidoamine based emulsifiers may be derived from the reaction of a polycarboxylic acid and a polar reactant such as a poly(allylamine), poly(ethyleneimine), polyaminopolyamide, polyetheramine and polyacrylamide to form a covalent linkage such as an amide or imide. In one or more embodiments, polar reactants in accordance with the present disclosure may include C1 to C10 alkyl amines, such as methyl amine, ethyl amine, and the like. Alkyl amines may be substituted or non-substituted, branched or unbranched, ethoxylated or propoxylated, saturated and unsaturated.

Polymeric Amines
Poly(ethyleneimine)

In one or more embodiments, polymeric amidoamine based emulsifiers may be derived from the reaction of a poly(ethyleneimine), a fatty acid, and a polycarboxylic acid/anhydride to form an emulsifier of the present disclosure. Thus, in such embodiments, linear poly(ethyleneimines), in one or more embodiments, and branched poly(ethyleneimines), in one or more other embodiments, may serve as a polar reactant. Other embodiments may include tailorable poly(ethyleneimine) dendrimers of selectable generation for the preparation of polymeric amidoamine emulsifiers. In one or more embodiments, the hydrophilic poly(ethyleneimine) may have at least five or more repeating unitsor ten or more repeating units in more particular embodiments. As mentioned, to form the polymeric emulsifier, the hydrophilic poly(ethyleneimine) backbone may be reacted with hydrophobic fatty acids, such as those described below, to form an amidoamine. Further, polymeric amindoamines prepared from poly(ethyleneimine) reacted with fatty acids may be further reacted with a polycarboxylic acid or anhydride (of a carboxylic acid) capping agent, such as those described below, which is capable of reacting with one or more of the remaining hydrophilic groups of the poly(ethyleneimine) to further increase the hydrophilicity of the resulting compound.

In one or more embodiments, polar reactants may be comprised of a poly(ethyleneimine) base of the general formula (I) or (II) where in one embodiment the number of repeating units may range from n=at least 3, in another n=at least 5 and in another n=up to 200:

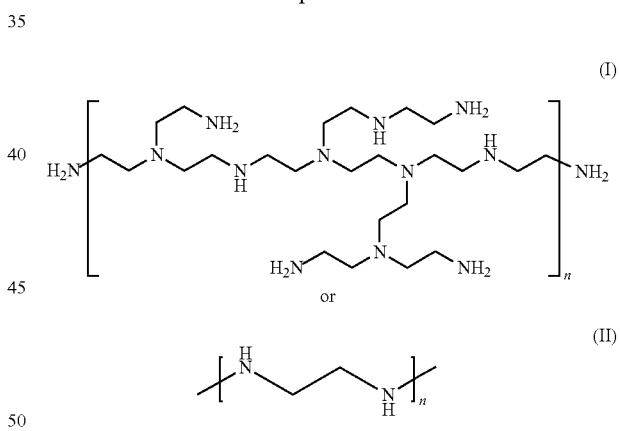

Thus, as shown from the above, some embodiments relate to a linear poly(ethyleneimine) base while others relate to branched poly(ethyleneimine) base reactants, each of which may be reacted with a fatty acid and then a polycarboxylic acid or anhydride. In some embodiments, the weight average molecular weight of the poly(ethyleneimine) nitrogen containing polar reactant including those exemplified above as formulae (I) and (II) may range from 200 Da to 8,000 Da. In some embodiments, the weight average molecular weight of the poly(ethyleneimine) nitrogen containing polar reactant including those exemplified above as formulae (I) and (II) may range from 700 Da to 3,000 kDa.

Poly(allylamine)

In one or more embodiments, polymeric amidoamine based emulsifiers may be derived from the reaction of a poly(allylamine), a fatty acid, and a polycarboxylic acid/ anhydride capping agent. Thus, in such embodiments, polar reactants in accordance with the present disclosure may include a poly(allylamine). In one or more embodiments, the hydrophilic poly(allylamine) backbone may include at least three, or at least five or, or at least ten or more repeating units. In some embodiments, the hydrophilic poly(allylamine) backbone may be reacted with hydrophobic fatty acids as described below. Polymeric amidoamines prepared from poly(allylamine) reacted with fatty acids may be further reacted with a polycarboxylic acid or anhydride (of a carboxylic acid) capping agent, capable of reacting with one or more of the remaining hydrophilic groups of the poly (allylamine) as further described below.

Thus, in one or more embodiments, polar reactants may be comprised of a poly(allylamine) base of the general formula (III):

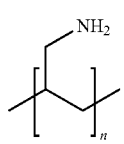

(III)

Where n may be at least 3, at least 5, or at least 10, in various embodiments. In some embodiments, the weight average molecular weight of the poly(allylamine) nitrogen containing polar reactant may range from 17,000 Da to 60,000 Da. In one or more embodiments, polar reactants may be prepared from allylamine oligomers having a number of constituent monomers in the range of 1 to 10 monomers.

Polyaminopolyamide

In one or more embodiments, polymeric amidoamine based emulsifiers may be derived from the reaction of a polyaminopolyamide, and a polycarboxylic acid/anhydride. Thus, in one or more embodiments, polar reactants in accordance with the present disclosure may include polyaminopolyamides comprised of linear polyakylene amines (such as polyethylene amines) of tunable size and a di-functional acid such as adipic acid, sebaccic acid, dimer acid, or dicarboxylic fatty acids, that can be further reacted with fatty acid capping agent, as described below, to generate a polymeric amidoamine emulsifier with a tailorable HLB. In one or more embodiments, the polyaminopolyamides may consist of at least three, or at least five, or at least ten or more repeating units, which may be defined as the total number of repeating units. In one or more embodiments, the polyaminopolyamide may include two or three linear polyalkylene amines (i.e., having at least two primary amines separated by at least two carbon atoms) and at least one di-acid per two to three linear polyalkylene amines. The reacted polyethyelene amine and di-acid may further repeat. Thus, the total number of repeating units may reflect the sum of both levels of repeating unit.

Thus, for example, in one or more embodiments, the polyaminopolyamide base may be of the general formula (IV)

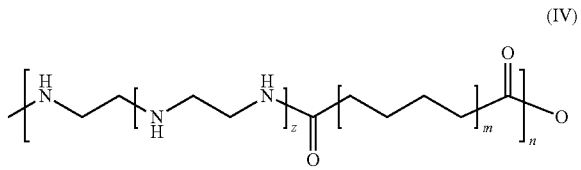

(IV)

where in one embodiment n is at least 1, 2, 3, 4, or 5, z is at least 1, 2, 3 or 5, and m is C2 to C18. Further, in one or more embodiments, n+z is at least 3 or 5. In some embodiments, the weight average molecular weight of the polyaminopolyamide base (prior to reaction with the fatty acid capping agent) may range from 200 Da to 8000 Da.

Ethoxylated/Propoxylated Amidoamine

In one or more embodiments, the polymeric amidoamine emulsifier may be comprised of a polyamine backbone and at least one ethylene oxide and/or propylene oxide copolymer. The resulting primary amine terminated ethoxylated/propoxylated molecules may possess additional functionality and may contain amines that are highly reactive with the fatty acids and di-acid capping reagents discussed above. Examples of such ethoxylated/propoxylated amidoamines are shown below:

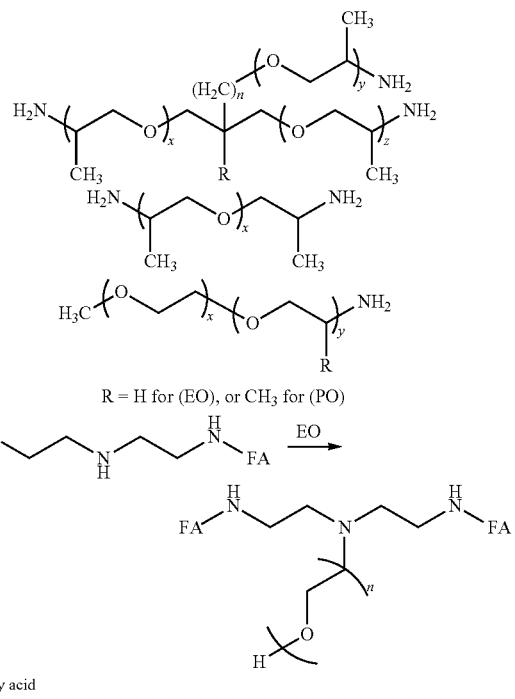

FA = fatty acid

In one or more embodiments the polymeric amidoamine emulsifier may be a polyetheramine that comprises ethoxylated/propoxylated monoamines, diamines and triamines. Such polyetheramine backbones may have a molecular weight ranging from 300 to 8000 Da. In one or more embodiments, the ethoxyled/propoxylated moieties of the amine branches can be controllably tuned to select specific emulsifier functionalities and features, including the resultant HLB value. The incorporation of ethoxylation moieties may also aid in controlling the rheology of the fluid, particularly at lower temperatures where the ratio of ethoxylation to propoxylation may be tuned to achieve the desired HLB value.

Fatty Acid

As described above, various polar reactants may be reacted with a fatty acid to provide the hydrophobic portion of the emulsifiers of the present disclosure. In one or more embodiments, the fatty acid may be any saturated or unsaturated (and optionally branched) fatty acid having a primary alkyl chain length with about 8 to about 32 carbon atoms therein. However, if branched, it is envisioned that the total carbon number may be greater than 24, with the C8-C24 primary alkyl chain optionally having one or more C1 to C24 branches where in one or more embodiments the fatty acid may be at least a C8 and branched. In one or more embodiments, the fatty acid may be saturated and branched, and in another it may be unsaturated and branched, and yet in another embodiment it may be linear and unsaturated.

Polycarboxylic Acid

As mentioned above and referenced in the above formulae, the polymeric emulsifier may also be formed with reaction with a hydrophilic capping agent. Thus, the hydrophilic capping agent referenced above may include a polycarboxylic acid, anhydride (of a carboxylic acid such as acetic acid or a polycarboxylic acid, including one of those described below such as, but not limited to, maleic anhydride and succinic anhydride), urea, isocyanates (such as methylisocyanate), alpha-halo-carboxylic acid (such as chloroacetic acid, chloropropionic acid, etc), oxirane, cyclic diesters (such as lactide or glycolide), or cyclic sulfonate ester (such as propanesultone or other sultones). Polycarboxylic acids may include, for example, lactic acid, glycolic acid and ether derivatives thereof, succinic acid, malonic acid, (ethylenedioxy) diacetic acid, maleic acid, oxalic acid, adipic acid, diglycolic acid, tartaric acid, tartronic acid, fumaric acid, citric acid, aconitic acid, citraconic acid, carboxymethyloxysuccinie acid, lactoxysuccinic acid, 2-oxy-1,1,3-propane tricarboxylic acid, oxydisuccinie acid, 1,1,2,2-ethane tetracarboxylic acid, 1,1,3,3-propane tetracarboxylic acid, 1,1,2,3-propane tetracarboxylic acid, cyclopentane-cis, cis, cis-tetracarboxylic acid, cyclopentadienide pentacarboxyiic acid, 2,3,4,5-tetrahydrofuran-cis, cis, cis-tetracarboxyiic acid, 2,5-tetrahydrofuran-cis-dicarboxylie acid, 1,2,3,4,5,6-hexane-hexaearhoxylic acid, mellitic acid, pyromellitic acid, phthahc acid, isophthaiic acid, and terphthalic acid.

Base Fluid

Wellbore fluids in accordance with the present disclosure may be prepared as an emulsion having a discontinuous aqueous phase within a continuous oleaginous phase. Base fluids useful for preparing emulsions in accordance with the present disclosure may include at least one of fresh water, sea water, brine, mixtures of water and water-soluble organic compounds, and mixtures thereof. In various embodiments, the aqueous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts.

Suitable oleaginous or oil-based fluids that may be used to formulate emulsions may include a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

In one or more embodiments, the oil:water ratio of an invert emulsion formulation may fall within the range of 30:70 to 95:5 in some embodiments, from 40:60 to 95:5 in some embodiments, from 50:50 to 70:30, or from 60:40 to 80:20 in yet other embodiments, where any lower limit can be used with any upper limit. In one or more embodiments the emulsifier may be present at concentration in the wellbore fluid in the range of 1.5 ppb to 8 ppb.

Wellbore Fluid Additives

The wellbore fluids of the present disclosure may also contain wellbore fluid additives such as emulsifiers, wetting agents, organophilic clays, viscosifiers, bridging agents, fluid loss control agents, alkalinity control agents, and corrosion inhibitors, which may be added to the compositions disclosed herein so as to impart additional functional properties.

Wetting agents that may be suitable for use include, but are not limited to, crude tall oil, oxidized crude tall oil, surfactants, organic phosphate esters, ether carboxylic acids, fatty amines, amidoamines, modified imidazolines and amidoamines, fatty acid amidoamines (including dry fatty acid amidoamines) and salts thereof, ethoxylates, branched or linear primary alcohol ethoxylates, secondary alcohol ethoxylates, branched decyltridecyl alcohol ethoxylates, branched or linear alkylphenol ethoxylates, branched or linear alkyl amine ethoxylates, alkyl ether amine ethoxylates, linear alcohol alkoxylates, alkyl aromatic sulfates and sulfonates such as alkyl benzene sulfonates, calcium dodecylbenzenesulphonate, and the like, and combinations or derivatives of these. Wetting agents may include, but are not limited to VERSAWET™ and VERSACOAT™, NOVAMUL™, FAZEMUL™, FAZEWET™, MEGAMUL™, SUREMUL™, ONEMUL™, ACTIMUL RD™, MUL-XT™ are non-limiting examples of commercially available wetting agents manufactured and distributed by M-I, L.L.C. that may be used in the fluids and methods of this disclosure.

To mitigate sag of the weighting agent within the oleaginous fluid, without creating a rheological profile that is problematic at colder temperatures when the viscosity of the fluid will naturally increase (particularly as the base fluid interacts with the weighting agent particles present in the fluid), the present inventors have determined that addition of particular wetting agents to the fluid may result in a weighted fluid that avoids sag without having excessive viscosity, particularly at colder temperatures.

In some embodiments, the wetting agents may be carboxylic acid-based wetting agents such as, for example, dicarboxylic fatty acids, dimer acids, or dimers of fatty acids. Dicarboxylic fatty acids have the general formula HOOC—R—COOH, wherein R is an alkyl or alkenyl group containing from 10 to 50 carbon atoms, and in particular embodiments from 20 to 40 carbon atoms. In other embodiments, wetting agents may be selected from the dimerization products of unsaturated dicarboxylic fatty acids, for example, such as products prepared by dimerization of unsaturated fatty acids containing from 8 to about 18 carbon atoms, including 9-dodecenoic, 9-tetradecenoic, 9-octadecenoic, octadecatetranoic acids, and the like.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Clays such as attapulgite, sepiolite, bentonite, and the like may also be used as viscosifiers. The amount of viscosifier used in the compositions may vary depending on downhole conditions, as understood by those skilled in the art. However, normally about 0.1% to 6% by weight range may be sufficient for most applications. VG-69™, VG-SUPREME™, VG-HT™, and VG-PLUS™ are organoclay available from M-I, L.L.C. (Houston, TX), and VERSA-HRP™ is a polyamide resin material available from M-I L.L.C. (Houston, TX) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL-HT™, and latex polymers. In embodiments, the fluid loss control agent may be selected from one or more of VERSATROL™, VERSALIG™, ECOTROL™ family of products, ONETROL-HT™, EMI 789, and NOVATECH™ F, which are all commercially available from MI SWACO (Houston, TX).

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. Weighting agents in accordance with the present disclosure may include commercially available additives such as M-I WATE™ available from M-I L.L.C. (Houston, TX). In other embodiments, the weighting agent may be a micronized weighting agent, optionally coated with a dispersant.

In embodiments, the weighting agent may be coated, for example, with dispersants such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used including polyacrylate esters such as polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 22 ppg or up to 19.5 ppg.(Please Verify)

In one or more embodiments, upon introducing a wellbore fluid of the present disclosure into a borehole, a filtercake may be formed which provides an effective sealing layer on the walls of the borehole preventing undesired invasion of fluid into the formation through which the borehole is drilled. Filter cakes formed by wellbore fluids of the present disclosure may effectively seal earthen formations, and may be stable at elevated temperatures. Further, it is also envisioned that in addition to use in drilling a well, the present emulsifiers may be used in any fluid containing an invert emulsion, including when drilling the reservoir section, use in completion operations, etc.

Further, it is also envisioned that the wellbore fluids of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading."

The method used in preparing wellbore fluids described herein is not critical. Conventional methods can be used to prepare the wellbore fluids in a manner analogous to those normally used, to prepare conventional oil-based drilling fluids. In one representative procedure, a desired quantity of oleaginous fluid such as a base oil and a suitable amount of carbon black materials are mixed together and the remaining components (if necessary) are added sequentially with continuous mixing. An invert emulsion of the present disclosure is formed by vigorously agitating, mixing or shearing the oleaginous fluid and the non-oleaginous fluid.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A wellbore fluid, comprising:

an oleaginous continuous phase;

a non-oleaginous discontinuous phase; and a polymeric amidoamine emulsifier stabilizing the non-oleaginous discontinuous phase in the oleaginous continuous phase, wherein the polymeric amidoamine emulsifier has at least 5 repeating units; wherein the emulsifier is the product of a reaction between:

a polycarboxylic acid/anhydride, a long chain fatty acid, a polar reactant, wherein the polar reactant comprises an acyclic polymer having nitrogen moieties that is one or more selected from poly(ethyleneimine).

2. The wellbore fluid of claim 1, wherein the repeating units are selected from group consisting of allylamine, polyaminopolyamide, N-alkyl acrylamides, (meth)acrylic acid, alkyleneamine reacted with a dicarboxylic acid, alpha-olefin-alt-maleic anhydride, styrene maleic anhydride, alkylene oxide, and alkylene amine.

3. The wellbore fluid of claim 1, wherein the emulsion is stable up to 375° F.

4. The wellbore fluid of claim 1, wherein the emulsion has an oil:water ratio within the range of 40:60 to 95:5.

5. The wellbore fluid of claim 1, wherein the polar reactant is derivatized with a polycarboxylic acid/anhydride that is one or more selected from a group consisting of alpha-olefin maleic anhydride, poly(acrylic) acid, poly (methacrylic) acid and poly(maleic anhydride).

6. The wellbore fluid of claim 1, wherein the polar reactant is ethoxylated and/or propoxylated.

7. The wellbore fluid of claim 1, wherein the emulsifier is present at a concentration in the range of 1.5 ppb to 8 ppb.

8. The wellbore fluid of claim 1, wherein the weight average molecular weight of the polar reactant is in the range of 200 Da to 8000 Da.

9. The wellbore fluid of claim 1, wherein the polar reactants have the general formula (I-II)

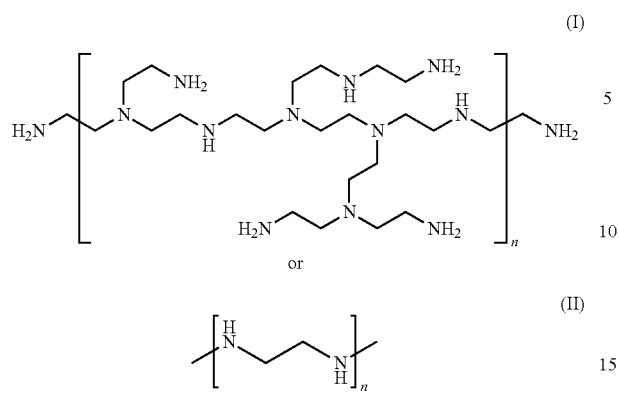
where n=at least 5 and at most 200, z=at least 1, m=C1 to C18.
10. The wellbore fluid of claim 1, wherein the oleaginous continuous phase comprises an oil-based fluid.
11. The wellbore fluid of claim 1, wherein the non-oleaginous discontinuous phase comprises an aqueous fluid.
* * * * *